US010241656B2

(12) United States Patent
Sheng

(10) Patent No.: US 10,241,656 B2
(45) Date of Patent: Mar. 26, 2019

(54) BATCH PROCESSING METHOD AND TERMINAL

(71) Applicant: Yulong Computer Telecommunication Scientific (Shenzhen) Co., Ltd., Shenzhen, Guangdong (CN)

(72) Inventor: Jingen Sheng, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 331 days.

(21) Appl. No.: 15/180,164

(22) Filed: Jun. 13, 2016

(65) Prior Publication Data

US 2016/0291843 A1    Oct. 6, 2016

Related U.S. Application Data

(63) Continuation of application No. PCT/CN2013/090331, filed on Dec. 24, 2013.

(51) Int. Cl.
*G06F 9/48* (2006.01)
*G06F 3/0481* (2013.01)
(Continued)

(52) U.S. Cl.
CPC ........ *G06F 3/04842* (2013.01); *G06F 3/0481* (2013.01); *G06F 3/0482* (2013.01);
(Continued)

(58) Field of Classification Search
CPC .................. G06F 3/048; G06F 3/0486; G06F 3/041–3/47
See application file for complete search history.

(56) References Cited

U.S. PATENT DOCUMENTS 8,487,895 B1    7/2013 Brown
9,148,613 B1 *  9/2015 Goldberg ........... H04N 5/44591
(Continued)

FOREIGN PATENT DOCUMENTS

CN    101789992 A    7/2010
CN    102033710 A    4/2011
(Continued)

OTHER PUBLICATIONS

Weinmann, Elaine, and Peter Lourekas. "Using the Quick Selection Tool in Adobe Photoshop CS5." PeachPit, Dec. 6, 2010, www.peachpit.com/articles/article.aspx?p=1661118.*
(Continued)

*Primary Examiner* — Jennifer N To
*Assistant Examiner* — Liang Y Li
(74) *Attorney, Agent, or Firm* — Young Basile Hanlon & MacFarlane, P.C.

(57)    ABSTRACT

Provided is a batch processing method and a terminal. The batch processing method comprises: according to a trigger action of a user, selecting a first operation target area on an operation interface, a remaining area on the operation interface and/or another operation interface being a second operation target area; moving the first operation target area to cover the second operation target area; executing a predetermined operation on an operation target covered in the second operation target area. Via the technical solution of the present disclosure, an operation target area is selected on an operation interface, the selected operation target area is moved and a batch operation is performed on an operation target in a remaining area, thereby significantly simplifying cumbersome operations of existing batch operations, and saving operation time.

19 Claims, 7 Drawing Sheets

(51) Int. Cl.
*G06F 3/0482* (2013.01)
*G06F 3/0484* (2013.01)
*G06F 3/0486* (2013.01)

(52) U.S. Cl.
CPC ........ *G06F 3/0486* (2013.01); *G06F 3/04817* (2013.01); *G06F 9/48* (2013.01)

(56) References Cited

U.S. PATENT DOCUMENTS

| | | | | |
|---|---|---|---|---|
| 2008/0225153 | A1* | 9/2008 | Fagans | G06F 3/0481 348/333.01 |
| 2012/0030566 | A1 | 2/2012 | Victor | |
| 2012/0306929 | A1* | 12/2012 | Chalkov | G06F 3/0488 345/666 |
| 2013/0024796 | A1 | 1/2013 | Seo | |
| 2013/0055168 | A1* | 2/2013 | Shiroor | G06F 3/0488 715/863 |
| 2013/0249841 | A1* | 9/2013 | Yang | G06F 3/0486 345/173 |
| 2015/0160829 | A1* | 6/2015 | Du | G06F 3/04817 715/765 |

FOREIGN PATENT DOCUMENTS

| | | |
|---|---|---|
| CN | 102789353 A | 11/2012 |
| CN | 102968254 A | 3/2013 |
| EP | 2618547 A | 7/2013 |

OTHER PUBLICATIONS

IT Buddy. How to Drag and Drop Files in Windows 7, 8, Vista and XP and Drag an Open Window. Jun. 24, 2018, www.itbuddy.org/drag-and-drop.html.*

How2instructionalvid. "Advanced Features in Windows XP—How to Select Multiple Files and Folders in Windows." YouTube, YouTube, May 20, 2011, www.youtube.com/watch?v=8XYTkAcWwbY.*

Lye, Ben. "Implementing Windows Server 2008 File System Quotas." Redgage, Nov. 11, 2009, www.red-gate.com/simple-talk/sysadmin/exchange/implementing-windows-server-2008-file-system-quotas/.*

* cited by examiner

BATCH PROCESSING METHOD AND TERMINAL

CROSS-REFERENCE TO RELATED APPLICATIONS

This application is a continuation of international application PCT/CN2013/090331, by YULONG COMPUTER TELECOMMUNICATION SCIENTIFIC (SHENZHEN) CO., LTD., filed on Dec. 24, 2013, and entitled BATCH PROCESSING METHOD AND TERMINAL.

TECHNICAL FIELD

The present disclosure relates to the technical field of communication, and particularly to a batch processing method and a terminal.

BACKGROUND

Batch hiding, deleting, or uninstalling of application icons can be done by operating on application icons one by one through certain trigger mode (long pressing the icon), in which operation style selection and secondary confirmation is required for the operation on each icon. When there are a relatively large number of icons to be operated on, it will be time consuming for the complex batch operations.

An alternative is to enter a corresponding interface to select application icons one by one, and clicking "Confirm" thereafter to complete the batch operation; while in some cases, the icons that the user desires to execute batch operation may be centered on certain page (such as when the user wants to batch uninstall applications of a carrier), but an application icon check interface rarely sorts application icons by page, so it will be complicated to find an application icon on a certain page from a list to select.

Therefore, how to execute batch operation on application icons quickly and easily has become an urgent problem to be solved.

SUMMARY

The present disclosure provides a batch processing method, which can execute batch operation on operation targets on an operation interface quickly and easily.

According to one aspect of the disclosure, a batch processing method is provided, which comprises: according to a trigger action of a user, selecting a first operation target area on an operation interface, a remaining area on the operation interface and/or another operation interface being a second operation target area; moving the first operation target area to cover the second operation target area; executing a predetermined operation on an operation target covered in the second operation target area.

Select one operation target area on the operation interface through certain trigger action of the user, drag or move the operation target area to cover the remaining area of the operation interface and/or another operation interface (cross-interface operation), and then execute certain operation on the covered operation target, thereby realizing batch operation in one step without selecting the application icons one by one, and consequently, simplifying operation steps significantly.

For an application icon interface of a terminal, the application icon interface can be made into a batch operation interface by certain method (long pressing the gap between screen icons); select one icon area on the operation interface (that is, the first operation target area, in which there are multiple icons); use the icon area to execute batch operation on the icons in the remaining area; if the batch operation is batch deletion, the covered multiple icons in the remaining area will be deleted.

In the abovementioned technical solution, preferably, it further comprises: displaying a plurality of segmentation lines on the operation interface when a predetermined operation signal is received; according to the trigger action, selecting one or more area segmentation line or an intersection of segmentation lines (hereinafter "intersection"), and according to the direction of movement of the selected area segmentation line or the intersection, selecting the first operation target area; alternatively, after one or more area segmentation line or the intersection is selected, dividing the operation interface into multiple operation areas, prompting the multiple operation areas which are selectable, and taking the operation area selected by the user as the first operation target area.

The predetermined operation signal can be as follows: the terminal receives the operation signal when the gap between screen icons is long pressed by the user, and at this time the area segmentation line is displayed on the operation interface; if the operation interface is the application icon interface, display the segmentation line between application icons. Here, the user can select an intersection or a single segmentation line as the segmentation boundary of operation target areas, and, according to the direction of movement of the selected segmentation line or the intersection, determine which area can be taken as a movable operation target area, thereby selecting the first operation target area. For instance, if the direction of movement of the area segmentation line is towards the lower side of the screen, determine that the selected first operation target area is located in the area above the area segmentation line; in like manner, if the direction of movement of the area segmentation line is towards the upper side of the screen, determine that the selected first operation target area is located in the area below the area segmentation line.

In addition, there can also be other area selecting methods. For instance, after the segmentation line or the intersection is selected, the user can take a specific area with respect to the selected segmentation line or the intersection as the first operation target area by default; for example, after the intersection of segmentation lines is selected, take the upper-left area as the first operation target area. Alternatively, after the segmentation line or the intersection is selected, display the divided multiple operation areas successively and prompt in a specific way so that the user can select one operation area according to the prompting. In the abovementioned technical solution, preferably, drag the selected area segmentation line or the intersection when the first operation target area is moved; stay the first operation area at a release location when it is detected that the selected area segmentation line or the intersection is released.

After the first operation target area is selected, hold down the segmentation line and the intersection and drag the first operation target area directly to release to a certain location in the second operation target area, thereby executing predetermined operation on multiple operation targets in the second operation target area, wherein the predetermined operation includes hiding or deleting application icons, and uninstalling applications. By dragging the selected operation target area, the user can execute batch operation on the application icons in the remaining area intuitively and flexibly, thereby significantly simplifying cumbersome operations of existing batch operations, and saving operation time.

In the abovementioned technical solution, preferably, restore the covered operation target to an original state when the selected area segmentation line or the intersection is dragged along an opposite direction.

By means of the technical solution of the disclosure, when holding down the segmentation line or the intersection to drag the first operation target area along the opposite direction, the first operation target area can be restored to a state before dragging; thus erroneous batch operation due to fault operation or poor drag can be reduced.

In the abovementioned technical solution, preferably, when the second operation target area is covered by the first operation target area and a releasing action of the user is detected, prompt a plurality of predetermined operations and execute a selected predetermined operation on the covered operation target according to the selection of the user.

By means of the abovementioned technical solution, pop up a predetermined operation prompting window on the screen directly when the first operation target area is dragged and then released to the second operation target area, and prompt the type of operations that can be executed in the second operation target area, such that the user can select the type of batch operation flexibly.

In the abovementioned technical solution, preferably, it may further comprise: after the predetermined operation is selected by the user, reminding the user if the second operation target area contains an operation target on which the predetermined operation cannot be executed.

Because the covered multiple operation targets will be operated on in batch and undesired operation targets can also be covered by the first operation target area, thus, to avoid fault operation, here remind the user which operation targets cannot be operated on in batch. For instance, the following applications cannot be deleted: system level applications, applications containing user privacy information, and important applications set by the user. When the second operation target area is covered by the first operation target area, it is required to determine whether all of the covered operation targets can be operated on in batch, and if it is found that any application as mentioned above exists, remind the user.

In the abovementioned technical solution, preferably, when the first operation target area is moved, restore the first operation target area to an original location according to a predetermined touch action or button operation, if the selection of the first operation target area is incorrect.

When it is found that the selection of the first operation target area is incorrect during the movement of the first operation target area, through a predetermined touch action, such as double clicking the icon on the operation interface, the first operation target area can be restored to the original location immediately. As a result of the cancellation of the movement of the first operation target area, trouble caused by fault operations can be reduced, and operation flexibility can be further improved.

In the abovementioned technical solution, preferably, the operation target is an application icon and the predetermined operation includes at least one of the following: deleting an application icon, hiding an application icon, uninstalling an application, encrypting an application or an application icon, backing up application data, and adding an application icon to a specified folder.

In the abovementioned technical solution, preferably, the operation interface includes at least one of the following: a desktop icon display interface, an application list display interface, and a table display interface.

The batch operation method achieved by dividing an area with segmentation lines does not apply only to the icon display interface; with regard to the application list display interface and the table display interface, the method can also be used to accomplish the batch operation of icons, applications, files and/or table data.

According to another aspect of the disclosure, it is further provided a terminal, which comprises: an area selecting unit, configured to select a first operation target area on an operation interface according to a trigger action of a user, a remaining area on the operation interface and/or another interface being a second operation target area; an area controlling unit, connected to the area selecting unit, configured to move the first operation target area to cover the second operation target area; a batch operating unit, connected to the area controlling unit, configured to execute a predetermined operation on an operation target covered in the second operation target area.

Select one operation target area on the operation interface through certain trigger action of the user, drag or move the operation target area to cover the remaining area of the operation interface, and then execute certain operation on the covered operation target in the remaining area, thereby realizing batch processing in one step without selecting the application icons one by one, and consequently, simplifying operation steps significantly.

For an application icon interface of a terminal, the application icon interface can be made into a batch operation interface by certain method (long pressing the gap between screen icons); select one icon area on the operation interface (that is, the first operation target area, in which there are multiple icons), use the icon area to execute batch operation on the icons in the remaining area; if the batch operation is batch deletion, the covered multiple icons in the remaining area will be deleted.

In the abovementioned technical solution, preferably, the area selecting unit comprises: an area dividing unit, configured to display a plurality of segmentation lines when a predetermined signal is received; an area determining unit, configured to select one or more area segmentation line or an intersection thereof according to the trigger action, and select the first operation target area according to direction of movement of the selected area segmentation line or the intersection; alternatively, after one or more area segmentation line or the intersection is selected, divide the operation interface into multiple operation areas, prompt the multiple operation areas which are selectable, and take the operation area selected by the user as the first operation target area.

The predetermined operation signal can be as follows: the terminal is configured to receive the operation signal when the gap between screen icons is long pressed by the user, and the area segmentation line is displayed on the operation interface; if the operation interface is the application icon interface, display the segmentation line between application icons. Here, the user can select the intersection or the segmentation line as the segmentation boundary of operation target areas, and, according to the direction of movement of the selected segmentation line or the intersection, determine which area can be taken as a movable operation target area, thereby selecting the first operation target area. For instance, if the direction of movement of the area segmentation line is towards the lower side of the screen, determine that the selected first operation target area is located in the area above the area segmentation line; in like manner, if the direction of movement of the area segmentation line is towards the upper side of the screen, determine that the selected first operation target area is located in the area below the area segmentation line.

In addition, there can also be other area selecting methods. For instance, after the segmentation line or the intersection is selected, the user can take a specific area with respect to the selected segmentation line or the intersection as the first operation target area by default; for example, after the intersection is selected, take the upper-left area as the first operation target area. Alternatively, after the segmentation line or the intersection is selected, display the divided multiple operation areas and prompt in a specific way, the user can select one operation area according to the prompting.

In the abovementioned technical solution, preferably, the area controlling unit comprises: an area moving unit, configured to drag the selected area segmentation line or the intersection when the first operation target area is moved; an area covering unit, configured to stay the first operation target area at a release location when it is detected that the selected area segmentation line is released.

After the first operation target area is selected, hold down the segmentation line and the intersection, drag the first operation target area directly to release to a certain location in the second operation target area, thereby executing predetermined operation on multiple operation targets in the second operation target area, wherein the predetermined operation includes hiding or deleting application icons, and uninstalling applications. By dragging the selected operation target area, the user can execute batch operation on the application icons in the remaining area intuitively and flexibly, thereby significantly simplifying cumbersome operations of existing batch operations, and saving operation time.

In the abovementioned technical solution, preferably, it further comprises: a first restoring unit, configured to restore the covered operation target to an original state when the selected area segmentation line or the intersection is dragged along an opposite direction.

By means of the technical solution of the disclosure, when holding down the segmentation line or the intersection to drag the first operation target area along the opposite direction, the first operation target area can be restored to a state before dragging; thus erroneous batch operation due to fault operation or poor drag can be reduced.

In the abovementioned technical solution, preferably, it further comprises: an operation prompting unit, configured to, when the second operation target area is covered by the first operation area and a releasing action of the user is detected, prompt a plurality of predetermined operations and execute a selected predetermined operation on the covered operation target according to the selection of the user.

By means of the abovementioned technical solution, a predetermined operation prompting window will be popped up on the screen directly when the first operation target area is dragged and then released to the second operation target area, and prompt the type of operations that can be executed in the second operation target area, such that the user can select the type of batch operation flexibly.

In the abovementioned technical solution, preferably, it may further comprise: a reminding unit, configured to, after the predetermined operation is selected by the user, remind the user if the second operation target area contains an operation target on which the predetermined operation cannot be executed.

Because the covered multiple operation targets will be operated on in batch and undesired operation targets can also be covered by the first operation target area, thus, to avoid fault operation, here remind the user which operation targets cannot be operated on in batch. For instance, the following applications cannot be deleted: system level applications, applications containing user privacy information, and important applications set by the user. When the second operation target area is covered by the first operation target area, it is required to determine whether all of the covered operation targets can be operated on in batch, and if it is found that any application as mentioned above exists, remind the user.

In the abovementioned technical solution, preferably, it further comprises: a second restoring unit, configured to, when the first operation target area is moved, restore the first operation target area to an original location according to a predetermined touch action or button operation, if the selection of the first operation target area is incorrect.

When it is found that the selection of the first operation target area is incorrect during the movement of the first operation target area, through a predetermined touch action, such as double clicking the icon on the operation interface, the first operation target area can be restored to the original location immediately. As a result of the cancellation of the movement of the first operation target area, trouble caused by fault operations can be reduced, and operation flexibility can be further improved.

In the abovementioned technical solution, preferably, the operation target is an application icon and the predetermined operation includes at least one of the following: deleting an application icon, hiding an application icon, uninstalling an application, encrypting an application or an application icon, backing up application data, and adding an application icon to a specified folder.

In the abovementioned technical solution, preferably, the operation interface includes at least one of the following: a desktop icon display interface, an application list display interface, and a table display interface.

The batch operation method achieved by dividing an area with segmentation lines does not apply only to the icon display interface; with regard to the application list display interface and the table display interface, the method can also be used to accomplish the batch operation of icons, applications, files and/or table data.

According to a further aspect of the disclosure, it is further provided a program product stored in a non-volatile machine-readable medium for batch processing. The program product includes machine executable instructions, when executed by a computer system, causing the system to execute the following steps: according to a trigger action of a user, selecting a first operation target area on an operation interface, a remaining area on the operation interface and/or another operation interface being a second operation target area; moving the first operation target area to cover the second operation target area; executing a predetermined operation in an operation target covered on the second operation target area.

According to a further aspect of the disclosure, it is further provided a non-volatile machine-readable medium storing a program product for batch processing. The program product includes machine executable instructions, when executed by a computer system, causing the system to execute the following steps: according to a trigger action of a user, selecting a first operation target area on an operation interface, a remaining area on the operation interface and/or another operation interface being a second operation target area; moving the first operation target area to cover the second operation target area; executing a predetermined operation on an operation target covered in the second operation target area.

According to a further aspect of the disclosure, it is further provided a machine-readable program, configured to enable the machine to execute any of the batch processing methods described in the abovementioned technical solutions.

According to a further aspect of the disclosure, it is further provided a storage medium storing a machine-readable program. Wherein, the machine-readable program is configured to enable the machine to execute any of the batch processing methods described in the abovementioned technical solutions.

DETAILED DESCRIPTION

To understand the abovementioned purposes, features, and advantages of the present disclosure more clearly, the present disclosure will be further described in detail below in combination with the accompanying drawings and the specific implementations. It should be noted that, the embodiments of the present application and the features in the embodiments may be combined with one another without conflicts.

Many specific details will be described below for sufficiently understanding the present disclosure. However, the present disclosure may also be implemented by adopting other manners different from those described herein. Accordingly, the protection scope of the present disclosure is not limited by the specific embodiments disclosed below.

Figure 1:
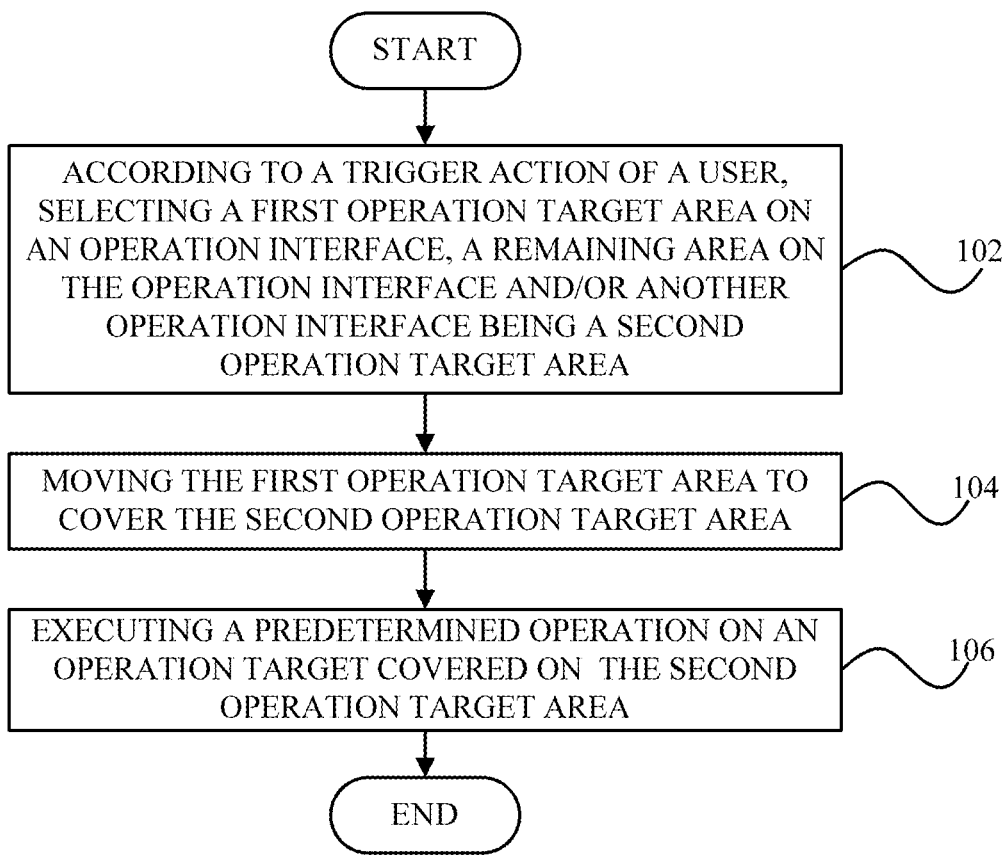
FIG. 1 is a flow chart illustrating a batch processing method in accordance with one embodiment of the disclosure.

FIG. 1 is a flow chart illustrating a batch processing method in accordance with one embodiment of the disclosure.

As illustrated in FIG. 1, a batching processing method in accordance with an exemplary embodiment of the disclosure may comprise the following steps: step 102, according to a trigger action of a user, selecting a first operation target area on an operation interface, a remaining area on the operation interface and/or another operation interface being a second operation target area; step 104, moving the first operation target area to cover the second operation target area; step 106, executing a predetermined operation on an operation target covered in the second operation target area.

Select one operation target area on the operation interface through certain trigger action of the user, drag or move the operation target area to cover the remaining area of the operation interface and/or another operation interface (cross-interface operation), and then execute certain operation on the covered operation target, thereby realizing batch operation in one step without selecting the application (in the figures, "App") icons one by one, and consequently, simplifying operation steps significantly.

For an application icon interface of a terminal, the application icon interface can be made into a batch operating interface by certain method (long pressing the gap between screen icons); select one icon area on the operation interface (that is, the first operation target area, in which there are multiple icons); use the icon area to execute batch operation on the icons in the remaining area; if the batch operating is batch deletion, the covered multiple icons in the remaining area will be deleted.

In the abovementioned technical solution, preferably, it further comprises: displaying a plurality of segmentation lines on the operation interface when a predetermined operation signal is received; according to the trigger action, selecting one or more area segmentation line or an intersection thereof, and according to the direction of movement of the selected area segmentation line or the intersection, selecting the first operation target area; alternatively, after one or more area segmentation line or the intersection is selected, dividing the operation interface into multiple operation areas, prompting the multiple operation areas which are selectable, and taking the operation area selected by the user as the first operation target area.

The predetermined operation signal can be as follows: the terminal receives the operation signal when the gap between screen icons is long pressed by the user, and the area segmentation line is displayed on the operation interface; if the operation interface is the application icon interface, display the segmentation line between application icons. Here, the user can select an intersection of segmentation lines or a single segmentation line as the segmentation boundary of the operation target areas, and, according to the direction of movement of the selected segmentation line or the intersection, determine which area can be taken as a movable operation target area, thereby selecting the first operation target area. For instance, if the direction of movement of the area segmentation line is towards the lower side of the screen, determine that the selected first operation target area is located in the area above the area segmentation line; in like manner, if the direction of movement of the area segmentation line is towards the upper side of the screen, determine that the selected first operation target area is located in the area below the area segmentation line.

In addition, there can also be other area selecting methods. For instance, after the segmentation line or the intersection is selected, the user can take a specific area with respect to the selected segmentation line or the intersection as the first operation target area by default; for example, after the intersection of the area segmentation line is selected, take the upper-left area as the first operation target area. Alternatively, after the segmentation line or the intersection is selected, display the divided multiple operation areas successively and prompt in a specific way so that the user can select one operation area according to the prompting.

In the abovementioned technical solution, preferably, drag the selected area segmentation line or the intersection when the first operation target area is moved; stay the first operation area at a release location when it is detected that the selected area segmentation line is released.

After the first operation target area is selected, hold down the segmentation line and the intersection and drag the first operation target area directly to release to a certain location in the second operation target area, thereby executing predetermined operation on multiple operation targets in the second operation target area, wherein the predetermined operation includes hiding or deleting application icons, and uninstalling applications. By dragging the selected target area, the user can execute batch operation on the application icons in the remaining area intuitively and flexibly, thereby significantly simplifying cumbersome operations of existing batch operations, and saving operation time.

In the abovementioned technical solution, preferably, restore the covered operation target to an original state when the selected area segmentation line or the intersection is dragged along an opposite direction.

By means of the technical solution of the invention, when holding down the segmentation line or the intersection to drag the first operation target area along the opposite direction, the first operation target area can be restored to a state before dragging; thus erroneous batch operation due to fault operation or poor drag can be reduced.

In the abovementioned technical solution, preferably, when the second operation target area is covered by the first operation target area and a releasing action of the user is detected, prompt a plurality of predetermined operations and execute a selected predetermined operation on the covered operation target according to the selection of the user.

By means of the abovementioned technical solution, pop up a predetermined operation prompting window on the screen directly when the first operation target area is dragged and then released to the second operation target area, and prompt the type of the operation that can be executed in the second operation target area, such that the user can select the type of batch operation flexibly.

In the abovementioned technical solution, preferably, it may further comprise: after the predetermined operation is selected by the user, reminding the user if the second operation target area contains an operation target on which the predetermined operation cannot be executed.

Because the covered multiple operation targets will be operated on in batch and undesired operation targets can also be covered by the first operation target area, thus, to avoid fault operation, here remind the user which operation targets cannot be operated on in batch. For instance, the following applications cannot be deleted: system level applications, applications containing user privacy information, and important applications set by the user. When the second operation target area is covered by the first operation target area, it is required to determine whether all of the covered operation targets can be operated on in batch, and if it is found that any application as mentioned above exists, remind the user.

In the abovementioned technical solution, preferably, when the first operation target area is moved, restore the first operation target area to an original location according to a predetermined touch action or button operation, if the selection of the first operation target area is incorrect.

When it is found that the selection of the first operation target area is incorrect during the movement of the first operation target area, through a predetermined touch action, such as double clicking the icon on the operation interface, the first operation target area can be restored to the original location immediately. As a result of the cancellation of the movement of the first operation target area, trouble caused by fault operation can be reduced, and operation flexibility can be further improved. In the abovementioned technical solution, preferably, the operation target is an application icon and the predetermined operation includes at least one of the following: deleting an application icon, hiding an application icon, uninstalling an application, encrypting an application or an application icon, backing up application data, and adding an application icon to a specified folder.

In the abovementioned technical solution, preferably, the operation interface includes at least one of the following: a desktop icon display interface, an application list display interface, and a table display interface.

The batch operation method achieved by dividing an area with segmentation lines does not apply only to the icon display interface; with regard to the application list display interface and the table display interface, the method can also be used to accomplish the batch operation of icons, applications, files and/or table data.

Figure 2:
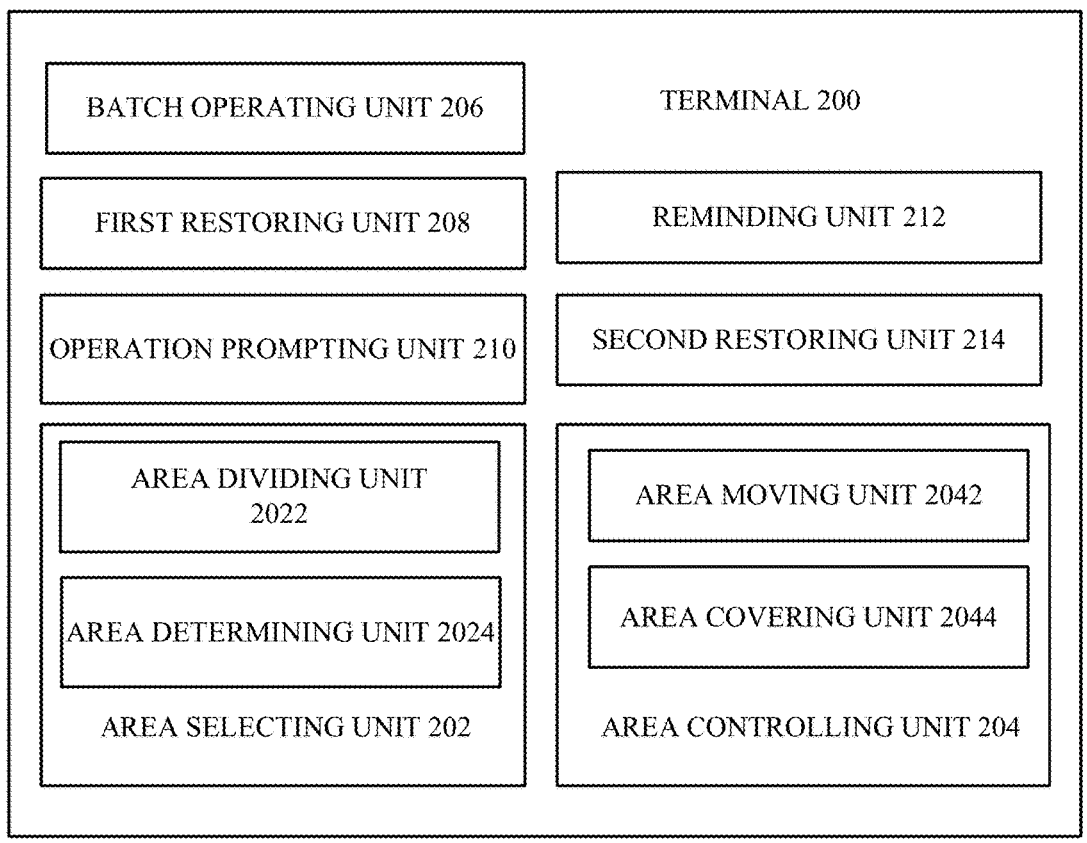
FIG. 2 is a block diagram illustrating a terminal in accordance with another embodiment of the disclosure.

FIG. 2 is a block diagram illustrating a terminal in accordance with another embodiment of the disclosure.

As illustrated in FIG. 2, a terminal 200 in accordance with an exemplary embodiment of the disclosure comprises: an area selecting unit 202, configured to select a first operation target area on an operation interface according to a trigger action of a user, a remaining area on the operation interface and/or another interface being a second operation target area; an area controlling unit 204, connected to the area selecting unit, configured to move the first operation target area to cover the second operation target area; a batch operating unit 206, connected to the area controlling unit, configured to execute a predetermined operation on an operation target covered in the second operation target area.

Select one operation target area on the operation interface through certain trigger action of the user, drag or move the operation target area to cover the remaining area of the operation interface, and then execute certain operation on the covered operation target in the remaining area, thereby realizing batch processing in one step without selecting the application icons one by one, and consequently, simplifying operation steps significantly.

For an application icon interface of a terminal, the application icon interface can be made into a batch operation interface by certain method (long pressing the gap between screen icons), select one icon area on the operation interface (that is, the first operation target area, in which there are multiple icons), use the icon area to execute batch operation on the icons in the remaining area; if the batch operation is batch deletion, the covered multiple icons in the remaining area will be deleted.

In the abovementioned technical solution, preferably, the area selecting unit comprises: an area dividing unit 2022, configured to display a plurality of segmentation lines when a predetermined signal is received; an area determining unit 2024, configured to select one or more area segmentation line or an intersection thereof according to the trigger action, and select the first operation target area according to direction of movement of the selected area segmentation line or the intersection; alternatively, after one or more area segmentation line or the intersection is selected, divide the operation interface into multiple operation areas, prompt the multiple operation areas which are selectable, and take the operation area selected by the user as the first operation target area.

The predetermined operation signal can be as follows: the terminal is configured to receive the operation signal when the gap between screen icons is long pressed by the user, and the area segmentation line is displayed on the operation interface, if the operation interface is the application icon interface, display the segmentation line between application icons. Here, the user can select the intersection or the segmentation line as the segmentation boundary of operation target areas, and, according to the direction of movement of the selected segmentation line or the intersection, determine which area can be taken as a movable operation target area, thereby selecting the first operation target area. For instance, if the direction of movement of the area segmentation line is towards the lower side of the screen, determine that the selected first operation target area is located in the area above the area segmentation line; in like manner, if the direction of movement of the area segmentation line is towards the upper side of the screen, determine that the selected first operation target area is located in the area below the area segmentation line.

In addition, there can also be other area selecting methods. For instance, after the segmentation line or the intersection is selected, the user can take a specific area with respect to the selected segmentation line or the intersection as the first operation target area by default; for example, after the intersection is selected, take the upper-left area as the first operation target area. Alternatively, after the segmentation line or the intersection thereof is selected, display the divided multiple operation areas and prompt in a specific way (such as flashing the area one by one according to area sequence), the user can select one operation area according to the prompting.

In the abovementioned technical solution, preferably, the area controlling unit comprises: an area moving unit 2042, configured to drag the selected area segmentation line or the intersection when the first operation target area is moved; an area covering unit 2044, configured to stay the first operation target area at a release location when it is detected that the selected area segmentation line is released.

After the first operation target area is selected, hold down the segmentation line and the intersection, drag the first operation target area directly to release to a certain location in the second operation target area, thereby executing predetermined operation on multiple operation targets in the second operation target area, wherein the predetermined operation includes hiding or deleting application icons, and uninstalling applications. By dragging the selected operation target area, the user can execute batch operation on the application icons in the remaining area intuitively and flexibly, thereby significantly simplifying cumbersome operations of existing batch operations, and saving operation time.

In the abovementioned technical solution, preferably, it further comprises: a first restoring unit 208, configured to restore the covered operation target to an original state when the selected area segmentation line or the intersection is dragged along the opposite direction.

By means of the technical solution of the disclosure, when holding down the segmentation line or the intersection to drag the first operation target area along the opposite direction, the first operation target area can be restored to a state before dragging; thus erroneous batch operation due to fault operation or poor drag can be reduced.

In the abovementioned technical solution, preferably, it further comprises: an operation prompting unit 210, configured to, when the second operation target area is covered by the first operation target area and a releasing action of the user is detected, prompt a plurality of predetermined operations and execute a selected predetermined operation on the covered operation target according to the selection of the user.

By means of the abovementioned technical solution, a predetermined operation prompting window will be popped up on the screen directly when the first operation target area is dragged and then released to the second operation target area, and prompt the type of operations that can be executed in the second operation target area, such that the user can select the type of batch operation flexibly.

In the abovementioned technical solution, preferably, it may further comprise: a reminding unit 212, configured to, after the predetermined operation is selected by the user, remind the user if the second operation target area contains an operation target on which the predetermined operation cannot be executed.

Because the covered multiple operation targets will be operated on in batch and undesired operation targets can also be covered by the first operation target area; thus, to avoid fault operation, here remind the user which operation targets cannot be operated on in batch. For instance, the following applications cannot be deleted: system level applications, applications containing user privacy information, and important applications set by the user. When the second operation target area is covered by the first operation target area, it is required to determine whether all of the covered operation targets can be operated on in batch, and if it is found that any application as mentioned above exists, remind the user.

In the abovementioned technical solution, preferably, it further comprises: a second restoring unit 214, configured to, when the first operation target area is moved, restore the first operation target area to an original location according to a predetermined touch action or button operation, if the selection of the first operation target area is incorrect.

When it is found that the selection of the first operation target area is incorrect during the movement of the first operation target area, through a predetermined touch action, such as double clicking the icon on the operation interface, the first operation target area can be restored to the original location immediately. As a result of the cancellation of the movement of the first operation target area, trouble caused by fault operation can be reduced, and operation flexibility can be further improved. In the abovementioned technical solution, preferably, the operation target is an application icon and the predetermined operation includes at least one of the following: deleting an application icon, hiding an application icon, uninstalling an application, encrypting an application or an application icon, backing up application data, and adding an application icon to a specified folder.

In the abovementioned technical solution, preferably, the operation interface includes at least one of the following: a desktop icon display interface, an application list display interface, and a table display interface.

The batch operation method achieved by dividing an area with segmentation lines does not apply only to the icon display interface; with regard to the application list display interface and the table display interface, the method can also be used to accomplish the batch operation of icons, applications, files and/or table data.

Next, the batch processing method will be explained in detail, wherein the icon display interface is used as an example.

Figure 3A:
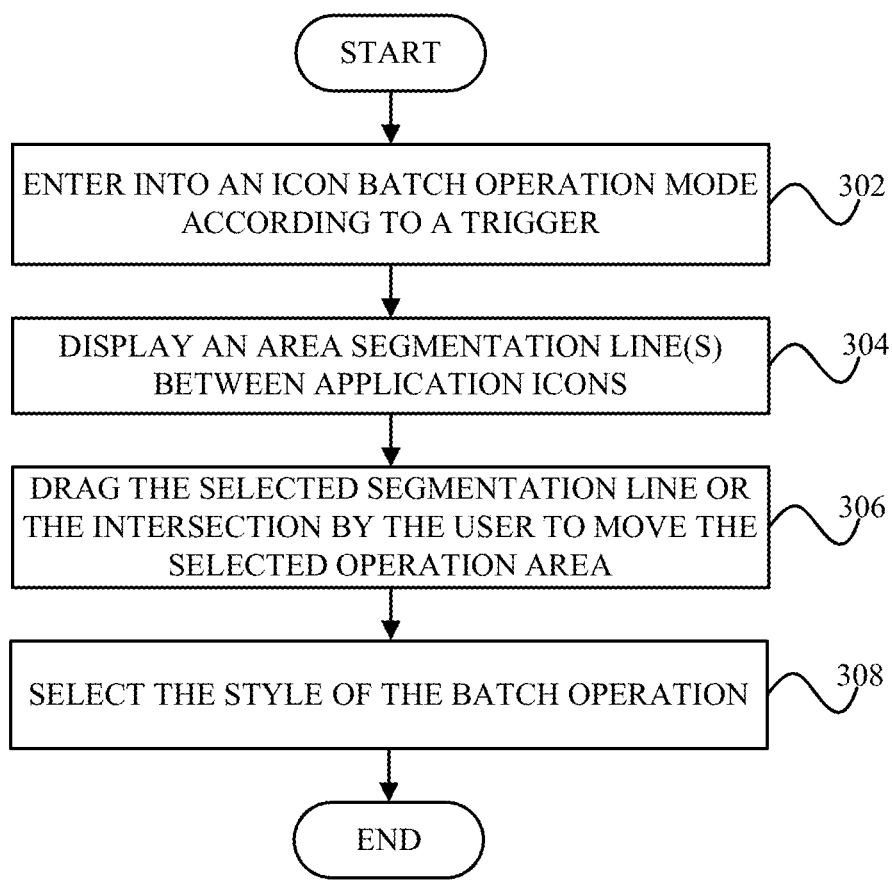
FIG. 3A is a flow chart illustrating a batch operation which takes application icon interface as an example in accordance with the embodiment of the disclosure.

FIG. 3A is a flow chart illustrating a batch operation which takes application icon interface as an example in accordance with the embodiment of the disclosure.

As illustrated in FIG. 3A, in step 302, enter into an icon batch operation mode according to a trigger of the user, wherein the icon display interface is used as the operation interface.

Figure 3B:
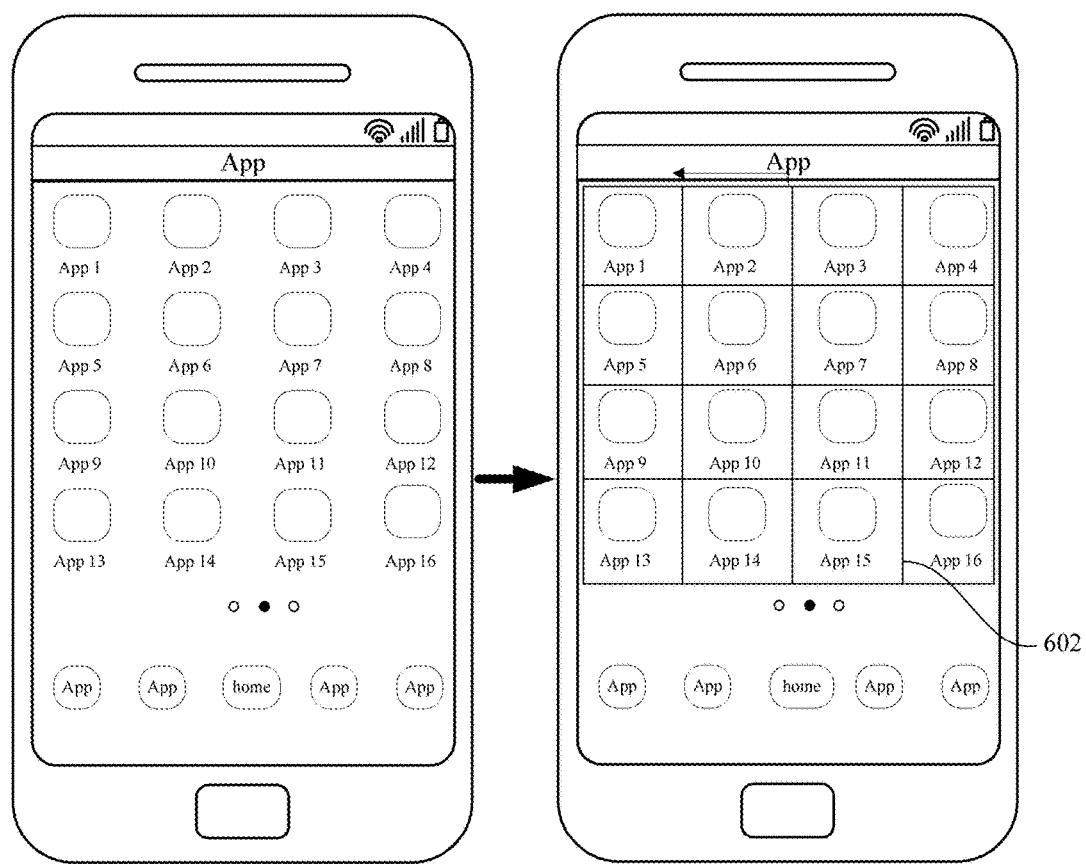
FIG. 3B is a schematic view illustrating a normal application interface and an interface displayed after the batch operation is triggered in accordance with the embodiment of the invention.

In step 304, an area segmentation line(s) is displayed on a terminal interface, wherein the terminal interface is divided into different areas via the abovementioned area segmentation lines. Refer to FIG. 3B, on the left side is a normal terminal interface, on which multiple application icons are displayed and arranged orderly; after the gap between icons is long pressed by the user, enter into the batch operation mode and display segmentation lines between icons on the terminal interface, here, a single segmentation line or an intersection of segmentation lines can be selected to divide the first operation target area and the second operation target area.

In step 306, the selected segmentation line or the intersection is dragged by the user to move the selected operation area.

Figure 4:
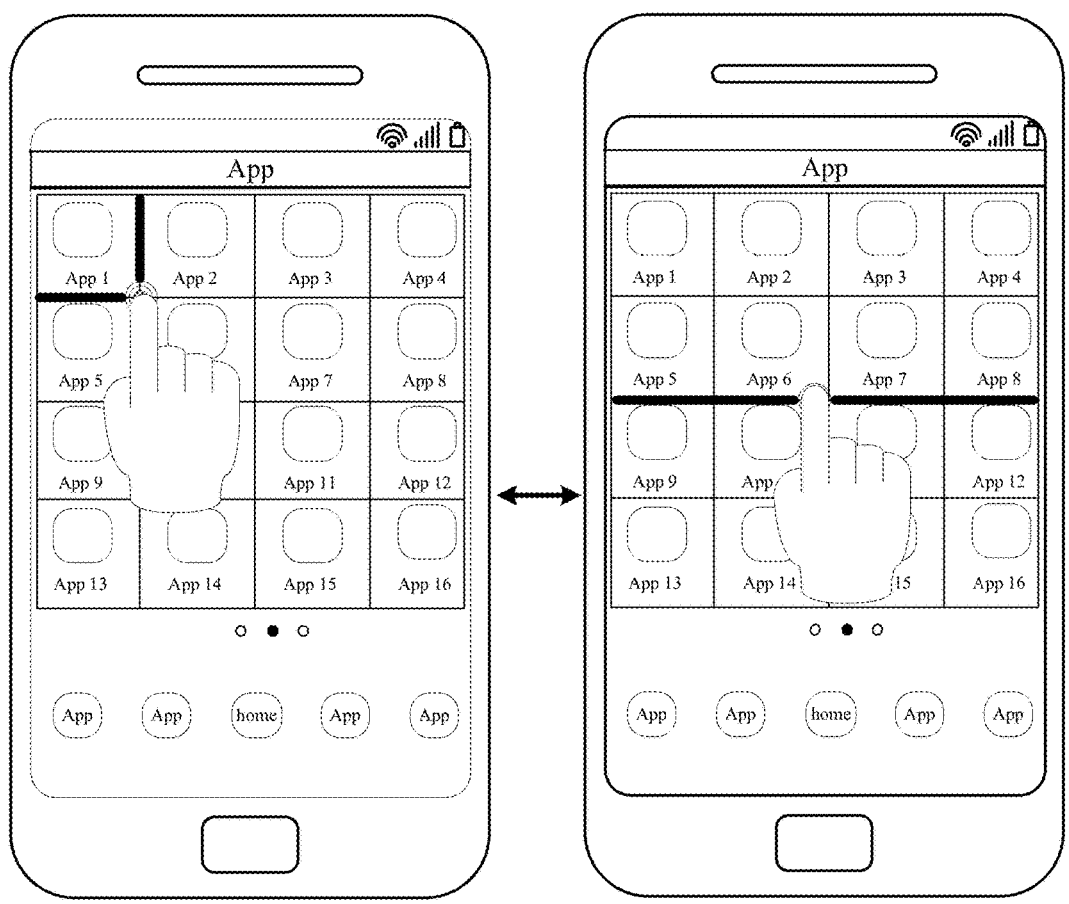
FIG. 4 is a schematic view illustrating an interface displayed after a segmentation line(s) and/or an intersection is selected in accordance with the embodiment of the disclosure.

FIG. 4 is a schematic view illustrating an interface displayed after a segmentation line(s) and/or an intersection thereof is selected in accordance with the embodiment of the disclosure. As illustrated in FIG. 4, on the left side is the scene where the intersection is clicked by the user, here, select the icons on the upper left side of the intersection as the first operation target area, and the remaining area (in addition to the remaining area on current page, still includes other menu page area) will be the second operation target area. The selected operation target area can be dragged towards arbitrary direction, such as towards the right lower direction, so that the first operation target area can cover the second operation target area, wherein the application icons covered in the second operation target area will be deleted or hidden. Still refer to FIG. 4, on the right side is the scene where a single segmentation line is clicked by the user, here, select the icons above the segmentation line as the first operation target area, the first operation target area will also be dragged when the segmentation line is dragged by a finger of the user, for instance, the first operation target can be dragged downward to cover the second operation target area, the application icons covered in the second operation target area will be deleted or hidden, or other operations may be performed.

To be clear, as illustrated in FIG. 4, when the intersection of segmentation lines is clicked by the user, the operation interface will be divided into multiple operation areas via the abovementioned intersection related segmentation lines, meanwhile, the multiple operation areas will be prompted in a specific way. As can be seen from FIG. 4, the current operation interface is divided into four areas via two segmentation lines perpendicular to each other, that is, a first area where application 1 is located, a second area where applications 2 and 3 are located, a third area where applications 6 and 7 are located, and a fourth area where application 5 is located. First, flash the frame of the first area, next, flash the frame of the second area, thereafter, flash the frame of the third area, and at the end, flash the frame of the fourth area. The flashing time of each frame is maintained at 3 seconds. If one area is selected during the flashing period by the user, then the selected area will be the first operation target area, and the other three areas and other menu page will be the second operation target area.

As another example, when the terminal interface is made into the batch operation interface, area segmentation lines will be displayed on the operation interface, for instance, the areas where applications 3 and 7 are located may be desired to be selected as the first operation target area, in this situation, select area segmentation lines around the areas where applications 3 and 7 are located successively.

Figure 5:
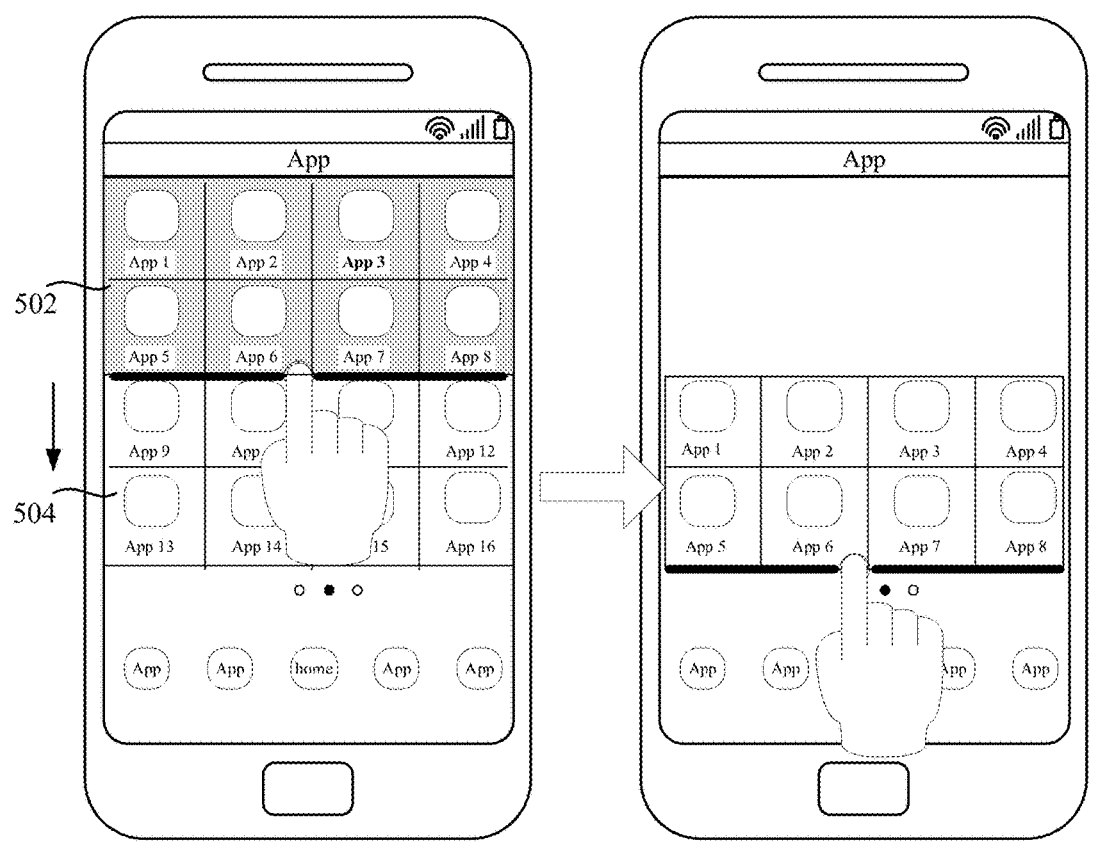
FIG. 5 is a schematic view illustrating an interface displayed after a first operation target area is dragged and then released to cover a second operation target area in accordance with the embodiment of the disclosure.

As illustrated in FIG. 5, on the left side is the scene where a single segmentation line is clicked by the user, and the icon display interface will be divided into upper and lower areas when the selected segmentation line is dragged downward by the user, because of the downward movement of the segmentation line, take the icon display area 502 above the segmentation line as the first operation area and take the icon display area 504 below the segmentation line as the second operation area. When the selected segmentation line is dragged downward by the user, the first operation target area will be moved either; besides, the dragging action can be released at an appropriate location in the second operation target area by the user, after that, the first operation area will stay at the currently released location, such that the first operation target area will cover the second operation target area, and the icons covered in the second operation target area will be deleted immediately. Before the dragging action is released, the selected segmentation line can be dragged along an opposite direction to revoke the movement.

In order to improve the flexibility of operations, even if an operation error is discovered after the current dragging action released, the original state can still be restored through preset methods, such as restore the first operation target area to the upper location through double clicking the operation interface, and the application icons deleted or hidden will be restored either.

In step 308, select the style of the batch operation, and execute batch operation on the covered icons in accordance with the selected batch operation style.

Figure 6:
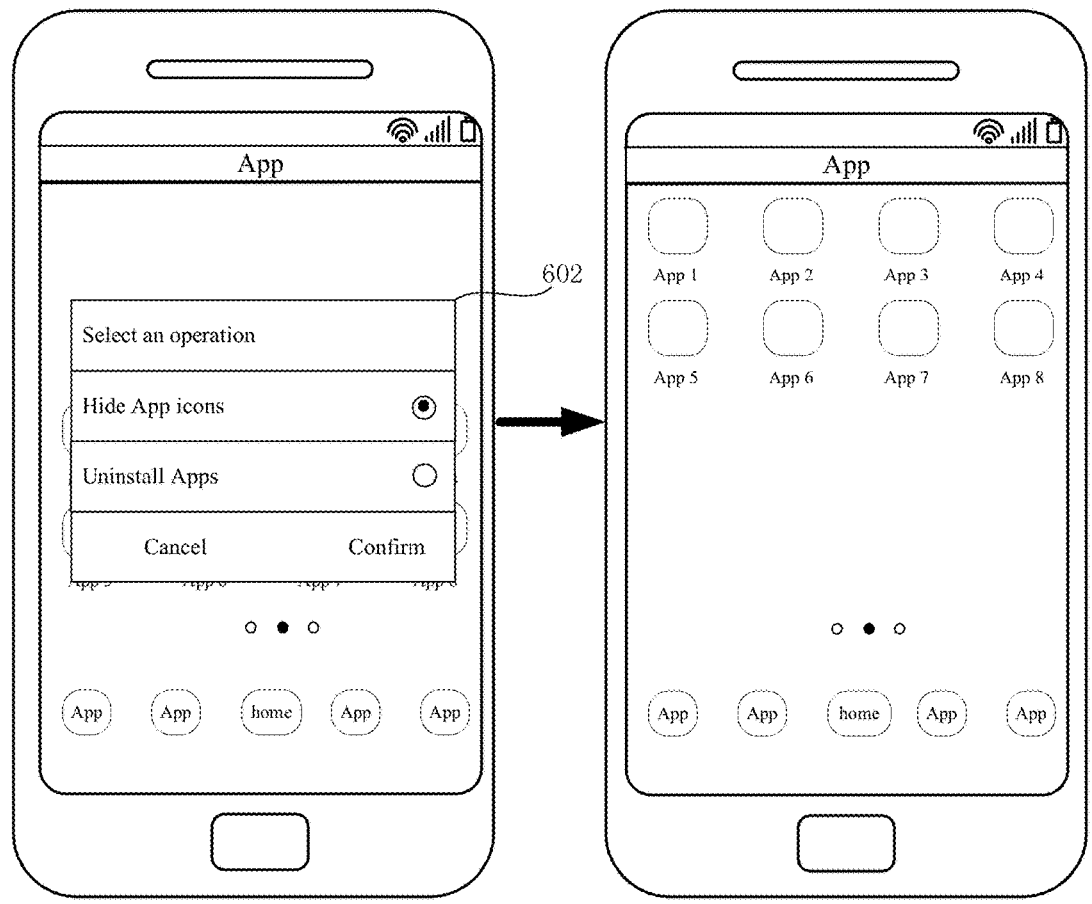
FIG. 6 is a schematic view illustrating an interface displayed after batch operation prompting and batch hiding or deleting in accordance with the embodiment of the invention.

FIG. 6 is a schematic view illustrating an interface displayed after batch operation prompting and batch hiding or deleting in accordance with the embodiment of the disclosure.

As illustrated in FIG. 6, on the left side is a predetermined batch operation interface 602, which is popped up when the first operation target area is dragged and then released to the second operation target area. Wherein, the batch operation can be accomplished by selecting "Hide application icons" or "Uninstall applications," alternatively, the batch operation can also be revoked by clicking "Cancel." On the right side of FIG. 6 is the interface displayed after "Hide application icons" is selected, as can be seen from FIG. 6, the icons of applications 9-16 are hidden, and the icons of applications 1-8 are restored to the original location, thus complete the batch hiding operation.

As parts of the icons are disappeared, the terminal can use icons on next page(s) to fill in the blank or, it's up to the user to decide whether to fill in the blank.

It should be understood that, the embodiments described above mainly illustrate the batch operation on icons, in fact, the batch processing method in accordance with the embodiments of the disclosure can also be applied to the interface in other forms (such as list), for instance, with regard to the list display interface, when the batch operation mode is triggered by the user, parts of the list will be covered, and the user can choose to delete, hide, or encrypt the covered list. The segmentation line can be dragged towards an opposite direction in the same way, so as to display the hidden/encrypted list.

In accordance with the embodiments of the disclosure, it is further provided a program product stored in a non-volatile machine-readable medium for batch processing. The program product includes machine executable instructions, when executed by a computer system, causing the system to execute the following: according to a trigger action of a user, selecting a first operation target area on an operation interface, a remaining area on the operation interface and/or another operation interface being a second operation target area; moving the first operation target area to cover the second operation target area; executing a predetermined operation on an operation target covered on the second operation target area.

In accordance with the embodiments of the disclosure, it is further provided a non-volatile machine-readable medium storing a program product for batch processing. The program product includes machine executable instructions, when executed by a computer system, causing the system to execute the following steps: according to a trigger action of a user, selecting a first operation target area on an operation interface, a remaining area on the operation interface and/or another operation interface being a second operation target area; moving the first operation target area to cover the second operation target area; executing a predetermined operation on an operation target covered in the second operation target area.

In accordance with the embodiments of the disclosure, it is further provided a machine-readable program, configured to enable the machine to execute any of the batch processing methods described in the abovementioned technical solutions.

In accordance with the embodiments of the disclosure, it is further provided a storage medium storing a machine-readable program. Wherein, the machine-readable program is configured to enable the machine to execute any of the batch processing methods described in the abovementioned technical solutions.

In accordance with the embodiments of the disclosure, it is further provided a apparatus, which comprise at least one processor and a memory, wherein the processor and the memory are connected to each other, for example, through a bus. Wherein the memory is configured to store computer-readable program code, and the processor is configured to invoke the computer-readable program code to execute any of the methods as described above.

By means of the technical solution of the present disclosure, select an operation target area on the operation interface, move the selected operation target area, and execute batch operation on the operation target in the remaining area, thereby significantly simplifying cumbersome operations of existing batch operations, and saving operation time.

The foregoing descriptions are merely preferred embodiments of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A batch processing method, comprising:
in response to a user long pressing a gap between application icons of an operation interface, displaying a plurality of segmentation lines on the operation interface,
the plurality of segmentation lines constituting gridlines between the application icons;
selecting, in response to a user action, a first operation target area on the operation interface, wherein a second operation target area comprises at least one of a remaining area on the operation interface or another operation interface;
dragging, by the user, one of a segmentation line or an intersection of segmentation lines of the first operation target area in order to move the contents of the first operation area to cover, at least partially, the second operation target area; and
in response to the user releasing the dragging while the first operation target area covers, at least partially, the second operation target area, executing a predetermined operation on an operation target, the operation target comprising an application icon of the second operation target area,
wherein the selecting, in response to the user action, the first operation target area comprises:
in response to one or more area segmentation lines or the intersection of segmentation lines being selected, dividing the operation interface into a plurality of operation areas, prompting the plurality of operation areas which are selectable, and determining an operation area as selected by the first user as the operation target area.

2. The method of claim 1, wherein selecting, in response to the user action, the first operation target area comprises:
selecting one or more area segmentation lines or an intersection of segmentation lines, and in accordance with a direction of movement of the selected area segmentation line or the intersection, selecting the first operation target area.

3. The method of claim 2, further comprising:
staying the first operation area at a release location when it is detected that the selected area segmentation line or the intersection of segmentation lines is released.

4. The method of claim 3, further comprising:
restoring the covered operation target to an original state in response to the selected area segmentation line or the intersection being dragged to an opposite direction.

5. The method of claim 1, wherein executing the predetermined operation on the operation target comprises:
prompting a plurality of predetermined operations and executing the predetermined operation, selected by the user, on the covered operation target.

6. The method of claim 5, further comprising:
in response to the predetermined operation being selected by the user, reminding the user when the second operation target area contains an operation target on which the predetermined operation cannot be executed.

7. The method of claim 1, further comprising:
when the first operation target area is moved, restoring the first operation target area to an original location in response to a predetermined touch action or button operation, when the selection of the first operation target area is incorrect.

8. The method of claim 1, wherein the predetermined operation comprises at least one of: deleting the application icon, hiding the application icon, uninstalling an application associated with the application icon, encrypting the application or the application icon, or backing up application data.

9. The method of claim 1, wherein the operation interface comprises at least one of: a desktop icon display interface, an application list display interface, and a table display interface.

10. A terminal, comprising:
a memory; and
a processor configured to execute instructions stored in the memory to:
in response to a user long pressing a gap between application icons of an operation interface, display a plurality of segmentation lines on the operation interface, the plurality of segmentation lines constituting gridlines between the application icons;

select, in response to a user action, a first operation target area on the operation interface, wherein a second operation target area comprises at least one of a remaining area on the operation interface or another operation interface;

move, in response to the user dragging one of a segmentation line or an intersection of segmentation lines of the first operation target area, the first operation target area to cover, at least partially, the second operation target area; and in response to the user releasing the dragging while the first operation target area covers, at least partially, the second operation target area, execute a predetermined operation on an operation target, the operation target comprising an application icon of the second operation target area, wherein the selecting, in response to the user action, the first operation target area comprises:

in response to one or more area segmentation lines or the intersection of segmentation lines being selected, dividing the operation interface into a plurality of operation areas, prompting the plurality of operation areas which are selectable, and determining an operation area as selected by the first user as the operation target area.

11. The terminal of claim 10, wherein the instructions further include instructions to:

select one or more area segmentation lines or an intersection of segmentation lines, and select the first operation target area in accordance with direction of movement of the selected area segmentation line or the intersection.

12. The terminal of claim 11, wherein the instructions further comprise instructions to:

stay the first operation target area at a release location when it is detected that the selected area segmentation line is released.

13. The terminal of claim 12, wherein the instructions further comprise instructions to:

restore the covered operation target to an original state in response to the selected area segmentation line or the intersection being dragged to the opposite direction.

14. The terminal of claim 10, wherein the instructions to execute the predetermined operation on the operation target comprise instructions to:

prompt a plurality of predetermined operations and execute a predetermined operation, selected by user, on the operation target.

15. The terminal of claim 14, wherein the instructions further comprise instructions to:

in response to the predetermined operation being selected by the user, remind the user when the second operation target area contains an operation target on which the predetermined operation cannot be executed.

16. The terminal of claim 10, wherein the instructions further comprise instruction to:

when the first operation target area is moved, restore the first operation target area to an original location in response to a predetermined touch action or button operation, when the selection of the first operation target area is incorrect.

17. The terminal of claim 10, wherein the predetermined operation comprises at least one of: deleting the application icon, hiding the application icon, uninstalling an application associated with the application icon, encrypting the application or the application icon, backing up application data of the application, or adding an application icon to a specified folder.

18. The terminal of claim 10, wherein the operation interface comprises at least one of: a desktop icon display interface, an application list display interface, and a table display interface.

19. A non-volatile computer-readable storage medium configured to store computer-readable program code, the computer-readable program code executed on an apparatus to perform:

in response to a user long pressing a gap between application icons of an operation interface, display a plurality of segmentation lines on the operation interface, the plurality of segmentation lines constituting gridlines between the application icons;

in response to a trigger action of the user, select a first operation target area on an operation interface, wherein a second operation target area comprises at least one of a remaining area on the operation interface or another operation interface;

drag, by the user, one of a segmentation line or an intersection of segmentation lines of the first operation target area in order to move the contents of the first operation target area to cover, at least partially, the second operation target area; and in response to the user releasing the dragging while the first operation target area covers, at least partially, the second operation target area, execute a predetermined operation on an operation target, the operation target comprising an application icon of the second operation target area, wherein the selecting, in response to the user action, the first operation target area comprises:

in response to one or more area segmentation lines or the intersection of segmentation lines being selected, dividing the operation interface into a plurality of operation areas, prompting the plurality of operation areas which are selectable, and determining an operation area as selected by the first user as the operation target area.

* * * * *